US012732797B2

(12) United States Patent
Hill et al.

(10) Patent No.: US 12,732,797 B2
(45) Date of Patent: Sep. 8, 2026

(54) IDENTIFICATION OF REDUCED CAPABILITY USER EQUIPMENT

(71) Applicant: Sony Group Corporation, Tokyo (JP)

(72) Inventors: Johan Hill, Lund (SE); Nafiseh Seyed Mazloum, Lund (SE); Basuki Priyanto, Lund (SE)

(73) Assignee: Sony Group Corporation, Tokyo (JP)

(*) Notice: Subject to any disclaimer, the term of this patent is extended or adjusted under 35 U.S.C. 154(b) by 197 days.

(21) Appl. No.: 18/270,566

(22) PCT Filed: Dec. 20, 2021

(86) PCT No.: PCT/EP2021/086905
§ 371 (c)(1),
(2) Date: Jun. 30, 2023

(87) PCT Pub. No.: WO2022/152521
PCT Pub. Date: Jul. 21, 2022

(65) Prior Publication Data

US 2024/0073675 A1 Feb. 29, 2024

(30) Foreign Application Priority Data

Jan. 15, 2021 (SE) .................................... 2150039-2

(51) Int. Cl.
*H04W 8/24* (2009.01)
*H04W 76/10* (2018.01)

(52) U.S. Cl.
CPC ............ *H04W 8/24* (2013.01); *H04W 76/10* (2018.02)

(58) Field of Classification Search
CPC ......... H04W 76/10; H04W 8/22; H04W 8/24; H04W 72/04
See application file for complete search history.

(56) References Cited

U.S. PATENT DOCUMENTS 10,085,278 B2 * 9/2018 Martin ................ H04L 27/2601
2009/0011783 A1 1/2009 Kitazoe
(Continued)

FOREIGN PATENT DOCUMENTS

CN 103814589 A 5/2014
CN 107371176 A 11/2017
(Continued)

OTHER PUBLICATIONS

Office Action and Swedish Search Report from corresponding Swedish Application No. 2150039-2, mailed on Sep. 10, 2021; 9 pages.
(Continued)

*Primary Examiner* — Congvan Tran
(74) *Attorney, Agent, or Firm* — Tucker Ellis LLP

(57) ABSTRACT

A method for use in a user equipment (10), UE, for progressive identification of the UE (10) as a reduced capability, RedCap, device, the method comprising: transmitting (910), to a wireless network at an initial access procedure, an identification message (81) identifying a RedCap type of the UE and a RedCap profile associated with the RedCap type, wherein the RedCap profile is indicative of a set of connectivity parameters to be used when establishing a connection to the wireless network; and transmitting (912), to the wireless network, a message (84) indicating one or more further RedCap profiles associated with said RedCap type to store in the wireless network.

20 Claims, 5 Drawing Sheets

(56) References Cited

U.S. PATENT DOCUMENTS

| | | | | |
|---|---|---|---|---|
| 2011/0216718 | A1* | 9/2011 | Faurie | H04W 8/22 370/329 |
| 2016/0219450 | A1* | 7/2016 | Wakabayashi | H04L 5/0053 |
| 2017/0347278 | A1 | 11/2017 | Gonzalez | |
| 2018/0199185 | A1 | 7/2018 | Tenny | |
| 2018/0227904 | A1 | 8/2018 | Raghunathan | |
| 2018/0242224 | A1 | 8/2018 | Pinheiro | |
| 2019/0110190 | A1* | 4/2019 | Van Lieshout | H04W 8/24 |
| 2019/0215833 | A1 | 7/2019 | Morioka | |
| 2019/0313239 | A1 | 10/2019 | Horn | |
| 2019/0342890 | A1 | 11/2019 | Tong | |
| 2019/0363843 | A1 | 11/2019 | Gordaychik | |
| 2019/0394668 | A1 | 12/2019 | Shaheen | |
| 2020/0107187 | A1 | 4/2020 | Lee | |
| 2020/0229076 | A1 | 7/2020 | Jin | |
| 2020/0245131 | A1 | 7/2020 | Vandervelde | |
| 2020/0245362 | A1 | 7/2020 | Liberg | |
| 2020/0280866 | A1 | 9/2020 | Nader | |
| 2023/0042274 | A1* | 2/2023 | He | H04W 74/0841 |
| 2024/0015844 | A1* | 1/2024 | Cui | H04W 76/28 |

FOREIGN PATENT DOCUMENTS

| | | | |
|---|---|---|---|
| CN | 110431864 | A | 11/2019 |
| CN | 112106395 | A | 12/2020 |
| CN | 112119657 | A | 12/2020 |
| WO | 2020030853 | A1 | 2/2020 |
| WO | 2020077230 | A1 | 4/2020 |
| WO | 2020145861 | A1 | 7/2020 |

OTHER PUBLICATIONS

International Search Report and Written Opinion from corresponding International Application No. PCT/EP2021/086905, mailed on Mar. 23, 2022, 11 pages.

Ericsson, "Higher-layer aspects for Redcap" 3GPP tsg_ran\wg1_rl1, tsgr1_101-e May 16, 2020 pp. 1-8, R1-2003292.

Interdigital, "Reduced capability device type definition" 3GPP tsg_ran\wg2_rl2, tsgr2_112-e Oct. 23, 2020, pp. 1-2, R2-2010458.

* cited by examiner

IDENTIFICATION OF REDUCED CAPABILITY USER EQUIPMENT

TECHNICAL FIELD

This disclosure relates to wireless communication, in which a user equipment operating as a wireless communication device communicates with a wireless network. Specifically, solutions are provided for identification and configuration of such user equipment as a device having reduced capability communication settings.

BACKGROUND

Wireless communication has been standardized under the supervision of the 3rd Generation Partnership Project (3GPP), and continued development and improvement of the specifications for conducting such wireless communication is carried out. On a general level, various 3GPP specification provide for wireless communication between a network and a communication device, generally referred to as a User Equipment (UE). Initially, wireless communication was standardized for voice communication, whereas further development of the specifications has predominantly concerned data communication.

One part of the development of wireless communication involves increasing the usable radio spectrum to higher frequencies, and for making wireless communication more versatile in terms of operation scenarios and types of UEs. In LTE (Long Term Evolution), also referred to as 4G, several UE categories were listed in the technical specifications, where such UE categories were distinguished from each other by operating bands, channel bandwidth, output power, modulations and code rates. For less complex UEs generally intended for machine-to-machine (M2M) communication, different protocols for narrowband Internet of Things (NB-IoT) and Machine-Type Communication (MTC), or LTE-M, were provided with specific categories such as Category M1, M2, NB1, NB2.

For the radio access technology referred to as New Radio (NR), which is provided for use in 5G networks, such UE categorization does not exist. Instead, different functionality is signaled by capabilities, providing different feature sets for e.g. uplink (UL) and downlink (DL) communication. FIG. 1 shows how signaling of capability information is carried out on a general level, between a UE and the network, as outlined in technical specification 3GPP TS 38.331 V16. The signaling, currently as of release 16 NR, of the capabilities and feature sets is performed on RRC (Radio Resource Control) level in RRC Connected mode.

In release 17 of the 3GPP specifications, a new type of UE device for NR is about to be defined, with comparatively reduced capability. Such devices are referred to as RedCap devices or UEs. Reduced Capability New Radio (NR-RedCap) may e.g. address a wide range of applications termed Mid-Speed Smart IoT with connectivity demands and services requirements higher than LTE-M/NB-IoT, but do not require Ultra-Reliable Low Latency Communication (URLLC) and high speed enhanced Mobile Broadband (eMBB). It may also address other applications termed Mid-latency or Mid-reliability smart IoT with connectivity demands and services requirements higher than LTE-M/NB-IoT, but not requiring Ultra-Reliable Low Latency Communication (URLLC) and high speed enhanced Mobile Broadband (eMBB).

In view of the implementation of RedCap UEs, there exists a need for identifying and carrying out access control of such RedCap UEs.

SUMMARY

In view of the general object of properly identifying a RedCap UE in the network, a solution as set out in the independent claims is hereby provided.

According to one aspect, a method is provided for use in a UE for progressive identification of the UE as a RedCap device, the method comprising:

transmitting, to a wireless network at an initial access procedure, an identification message identifying a RedCap type of the UE and a RedCap profile associated with the RedCap type, wherein the RedCap profile is indicative of a set of connectivity parameters to be used when establishing a connection to the wireless network; and transmitting, to the wireless network, a message indicating one or more further RedCap profiles associated with said RedCap type to store in the wireless network.

By means of the proposed solution, progressive identification of the UE is provided. The identification of the UE as a RedCap device is provided at initial access, so as to be able to connect to the network, whereas supplemental identification of one or more RedCap profiles according which the UE may operate are subsequently provided to the network.

DETAILED DESCRIPTION

Figure 1:
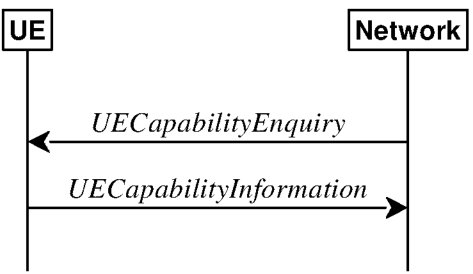
FIG. 1 illustrates provision of UE capability information from a UE to the network, according to prior art specification.

In the following description, for purposes of explanation and not limitation, details are set forth herein related to various embodiments. However, it will be apparent to those skilled in the art that the present invention may be practiced in other embodiments that depart from these specific details. In some instances, detailed descriptions of well-known devices, circuits, and methods are omitted so as not to obscure the description of the present invention with unnecessary detail. The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented and are thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and (where appropriate) state machines capable of performing such functions. In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof. The terms "receive" or "receiving" data or information shall to be understood as "detecting, from a received signal".

Figure 2:
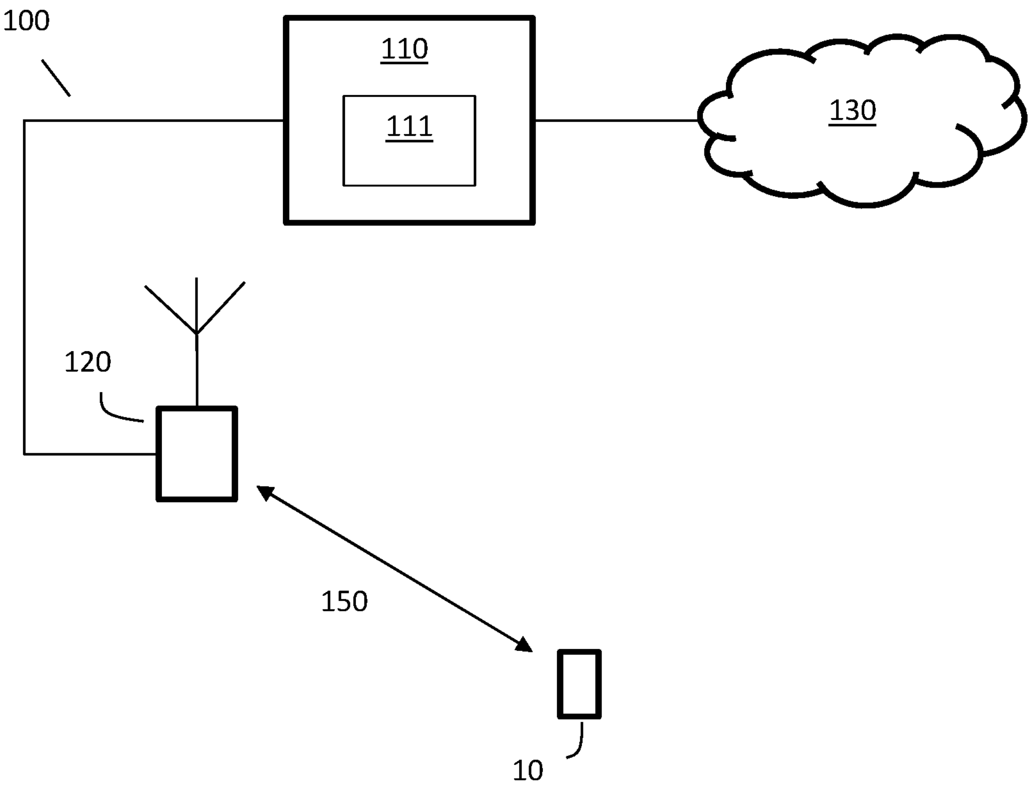
FIG. 2 schematically illustrates an implementation of a wireless communication system, in which a UE communicates with a wireless network through an access node of the network. according to various embodiments.

FIG. 2 illustrates a high-level perspective of operation of a UE 10 in a wireless network 100. The wireless network 100 may be a radio communication network 100, configured to operate under the provisions of 5G NR as specified by Third Generation Partnership Project (3GPP), according to various embodiments outlined herein. The wireless network 100 may comprise a core network 110, which in turn may comprise a plurality of core network nodes. The drawing shows a core network node 111 which may comprise or realize an NR Access & Mobility management Function (AMF), or an LTE Mobility Management Entity (MME). Other core network entities may include further nodes realizing various functions, which are not shown, such as a Session Management Function (SMF), a User Plane Function (UPF), and one or more gateways such as a Serving Gateway and a PDN Gateway. The core network is connected to at least one access network comprising one or more base stations or access nodes, of which one access node 120 is illustrated. The access node 120 is configured for wireless communication 150 with various UEs, of which only the UE 10 is shown. The core network 110 may in turn be connected to other networks 130.

Before discussing further details and aspects of the proposed method, functional elements for the UE 10, configured to carry out the proposed solution, will be briefly discussed.

Figure 3:
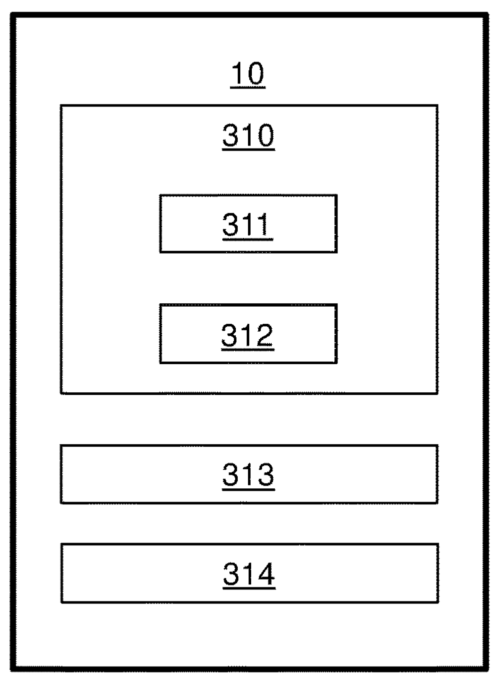
FIG. 3 schematically illustrates a UE configured to communicate with the wireless network according to various embodiments.

FIG. 3 schematically illustrates an example of the UE 10 for use in a wireless network 100 as presented herein, and for carrying out various method steps as outlined.

The UE 10 comprises a radio transceiver 313 for communicating with other entities of the radio communication network 100, such as the access node 120, in different frequency bands. The transceiver 313 may thus include a radio receiver and transmitter for communicating through at least an air interface. In a NR implementation, the access node 120 may be referred to as a gNB.

The UE 10 may further comprise an antenna system 314, which may include one or more antenna arrays. In various examples the UE 1 is configured to operate with a single beam, wherein the antenna system 314 is configured to provide an isotropic sensitivity to transmit radio signals. In other examples, the antenna system 314 may comprise a plurality of antennas for operation of different beams in transmission and/or reception.

The UE 10 further comprises logic circuitry 310 configured to communicate data, via the radio transceiver, on a radio channel 150, to the wireless communication network 100.

The logic circuitry 310 may include a processing device 311, including one or multiple processors, microprocessors, data processors, co-processors, and/or some other type of component that interprets and/or executes instructions and/or data. The processing device 311 may be implemented as hardware (e.g., a microprocessor, etc.) or a combination of hardware and software (e.g., a system-on-chip (SoC), an application-specific integrated circuit (ASIC), etc.). The processing device 311 may be configured to perform one or multiple operations based on an operating system and/or various applications or programs.

The logic circuitry 310 may further include memory storage 312, which may include one or multiple memories and/or one or multiple other types of storage mediums. For example, the memory storage 312 may include a random access memory (RAM), a dynamic random access memory (DRAM), a cache, a read only memory (ROM), a programmable read only memory (PROM), flash memory, and/or some other type of memory. The memory storage 312 may include a hard disk (e.g., a magnetic disk, an optical disk, a magneto-optic disk, a solid state disk, etc.). The memory storage 312 is configured for holding computer program code, which may be executed by the processing device 311, wherein the logic circuitry 310 is configured to control the UE to carry out any of the method steps as provided herein. Software defined by said computer program code may include an application or a program that provides a function and/or a process. The software may include device firmware, an operating system (OS), or a variety of applications that may execute in the logic circuitry 310.

Obviously, the UE 10 may include other features and elements than those shown in the drawing or described herein, such as a power supply, a casing, a user interface, sensors, etc., but are left out for the sake of simplicity.

Figure 4:
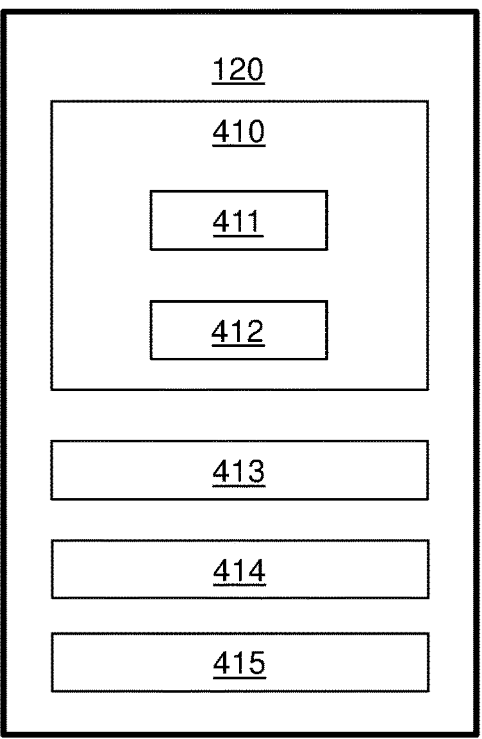
FIG. 4 schematically illustrates an access node of the wireless network according to various embodiments.

FIG. 4 schematically illustrates an access node 120 of the wireless network 100 as presented herein, and for carrying out the method steps as outlined. In various embodiments, the access node 120 is a radio base station for operation in the radio communication network 100, to serve one or more radio UEs, such as the UE 10.

The access node 120 may comprise a wireless transceiver 413, such as a radio transceiver for communicating with other entities of the radio communication network 100, such as the terminal 10. The transceiver 413 may thus include a radio receiver and transmitter for communicating through at least an air interface.

The access node 120 further comprises logic circuitry 410 configured to control the access node 120 to communicate with the UE 10 via the radio transceiver 413 on a radio channel 150.

The logic circuitry 410 may include a processing device 411, including one or multiple processors, microprocessors, data processors, co-processors, and/or some other type of component that interprets and/or executes instructions and/or data. Processing device 411 may be implemented as hardware (e.g., a microprocessor, etc.) or a combination of hardware and software (e.g., a system-on-chip (SoC), an application-specific integrated circuit (ASIC), etc.). The processing device 411 may be configured to perform one or multiple operations based on an operating system and/or various applications or programs.

The logic circuitry 410 may further include memory storage 412, which may include one or multiple memories and/or one or multiple other types of storage mediums. For example, memory storage 412 may include a random access memory (RAM), a dynamic random access memory (DRAM), a cache, a read only memory (ROM), a programmable read only memory (PROM), flash memory, and/or some other type of memory. Memory storage 412 may include a hard disk (e.g., a magnetic disk, an optical disk, a magneto-optic disk, a solid state disk, etc.).

The memory storage 412 is configured for holding computer program code, which may be executed by the processing device 411, wherein the logic 410 is configured to control the access node 120 to carry out any of the method steps as provided herein. Software defined by said computer program code may include an application or a program that provides a function and/or a process. The software may include device firmware, an operating system (OS), or a variety of applications that may execute in the logic 410.

The access node 120 may further comprise, or be connected to, an antenna 414, which may include an antenna array. The logic 410 may further be configured to control the radio transceiver to employ an anisotropic sensitivity profile of the antenna array to transmit radio signals in a particular transmit direction. The access node 120 may further comprise an interface 415, configured for communication with the core network 110. Obviously, the access node 120 may include other features and elements than those shown in the drawing or described herein, such as a power supply and a casing etc.

A rich set of capabilities and feature sets are defined for NR UEs. RedCap NR UEs will not be able to support all those capabilities and features. Contrary to LTE where specific channels are provided for e.g. NB-IoT, an NR RedCap UE needs to indicate to the network 100 in some way that it is a reduced capability device. According to the solution proposed herein, progressive identification of the RedCap is provided.

The solution is based on the notion that multiple different groups of UE capabilities are defined, associated with different RedCap devices, or different RedCap use cases. The grouping is in some embodiments based on hardware capabilities and/or use-cases. As an example, Group 1 may contain UE capabilities with the smallest maximum bandwidth, the smallest number of antennas, etc. Such a low complexity group may typically be applied for a wireless sensor use-case. A RedCap UE 10 may communicate with the network 100 according to a certain RedCap profile, which may indicate UE capability information or connectivity parameters associated with one group. The RedCap profiles may comprise UE radio access unique parameters defining a use cases, such as bandwidth, throughput, processing capability, MIMO layers, Carrier Frequency etc.

The proposed solution involves the UE 10 providing an early indication of a UE group, by indicating a RedCap profile, in an uplink message during initial access to the network 100. Specifically, the early identification of the UE 10 as a RedCap UE may indicate an associated RedCap profile that points out a minimum capability setting that can be supported by the UE 10. The minimum capability may indicate a start state of a RedCap UE 10, such as a minimum set of connectivity parameters required for entering a connected mode of the UE 10. The minimum capability may be defined by specification. For instance, this can include the minimum number of antennas at TX and RX side, minimum processing time, modulation scheme, supported coding scheme, etc.

In various embodiments, the start state of the RedCap UE 10 can also comprise a patch of capabilities on top of the minimum capabilities, where this patch configuration has been agreed with the network 100 at any previous connection of the UE 10.

At the early indication at initial access (e.g. PRACH signaling), the UE 10 provides a type indicator, identifying a RedCap type of the UE 10. In various embodiments, there may be a plurality of different RedCap types defined, wherein the type indicator not only identifies the UE 10 as a RedCap device but also which one of the plurality of RedCap types it is. This is advantageous since RedCap devices can be used for large spans of applications, from small sensor-type devices (low-end) to surveillance camera (high-end). For instance, a certain RedCap type can be devised to be used in a certain carrier frequency range e.g. FR1 or FR2.

In response to the early indication during initial access, the access node 120 of the network 100 can provide appropriate configuration to the RedCap UE 10, such as device cell-specific configuration. In some embodiments, the network 100 may provide a response in the form of system information, e.g. cell barring or specific resource allocation. Once the UE 10 transmits the early indication, identifying the RedCap profile, the access node 120 interprets that this UE 10 is requesting to read the system information related to this profile. The access node 120 will then provide the response in system information. In some embodiments, the network 100 may provide a response in the form of control/scheduling information of message two or message four, e.g., cell baring or specific resource allocation.

Figure 5:
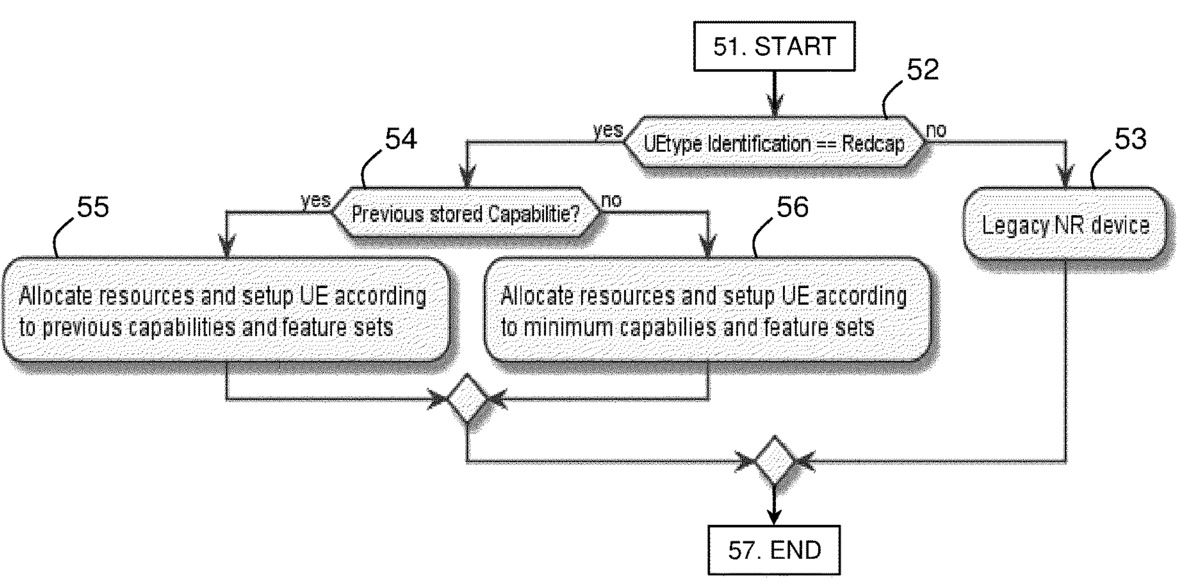
FIG. 5 schematically illustrates an activity chart over initial access of the UE to the network, according to various embodiments.

FIG. 5 schematically illustrates operation of the access node 120 at initial access according to some embodiments. The process starts at 51, which in some embodiments may include transmitting a paging message to the UE 10.

During the initial access (e.g. PRACH procedure), the access node 120 can obtain an identification message from the UE 10. The content of the identification message may be conveyed from the UE 10 as one or more separate messages.

The identification message may comprise a type indicator, based on which the access node 120 can identify 52 whether the UE 10 is a RedCap UE or a legacy UE. In some embodiments using 4-step PRACH, the identification message may be provided during msg 1, e.g., via a separate initial UL Bandwidth Part (BWP), a separate PRACH resource, or PRACH preamble partitioning. Alternatively, the identification message may be transmitted during msg 3 transmission, or msg 5. Where 2-step PRACH is used, the identification message may be conveyed in msg A. As outlined, the type indicator may in various embodiments not only identify the UE as a RedCap device, but also which one of a plurality of different predetermined types of RedCap devices, which may be defined in technical specifications.

Upon identification that the UE is a legacy UE, i.e., not a RedCap device, the process may proceed with legacy PRACH 53. However, where the type indicator identifies the UE as a RedCap device 10, PRACH may continue 54 based on a profile indicator indicated in the identification message.

The RedCap profile indicated at initial access is associated with the RedCap type of the UE 10, and is indicative of a set of connectivity parameters to be used, such as when establishing a connection. The connectivity parameters may comprise information on one or more of for instance channel frequency, supported bandwidth, BWP, supported Tx/Rx antenna, supported max speed and frequency range, e.g. FR1/FR2. Additionally, several other properties can be identified such as operating bands, the maximum UE bandwidth, number of Rx branches, MIMO layers, modulation order, duplex operations, processing performance, need of coverage recovery/enhancement etc. In some embodiments, the UE 10 can indicate, by means of the identification message, whether it wants to perform its communication using a previously stored capability or using its minimum capability, i.e., the minimum capability or feature set associated with the RedCap type. The RedCap type may indicate a predetermined certain use cases, known to the network 100 by definition in a 3GPP technical specification, such as for example Industrial wireless sensors, Video surveillance and Wearables. Indication of a certain RedCap profile can be done by for instance transmitting a profile indicator in the identification message, pointing to a certain RedCap profile and thus indicating a group of capabilities. As indicated, this information may be conveyed during e.g. msg 1 or msg 3 transmission, or msg 5, or during msg A transmission. In some embodiments, absence of a profile indicator in the identification message will trigger the network to apply connectivity parameters associated with a predefined minimum capability and feature set for the RedCap type in question.

The identification message signaled in uplink during initial access allows for the network 100 to identify the RedCap type, and to apply appropriate associated connectivity parameters for establishing a connection. Specifically, a certain RedCap profile which has been previously stored in the network, associated with the RedCap type, may be indicated, so as to accomplish a connection which is suitable for the UE 10. As an illustrative example: if the UE 10 is connecting to the network 100 for the purpose of uplink streaming, such as video surveillance data, and previously has stored an associated RedCap profile for uplink streaming, the UE 10 can run that application without having to upload related capability information again. If, on the other hand, the UE 10 is connecting for the purpose of activating a new or different use case, such as a different type of application with a different RedCap profile than it has done at a previous connected state, such as a last connected state, the UE 10 may be configured to not indicate a prestored RedCap profile at initial access and instead employ the minimum settings.

The proposed solution further involves providing the possibility of subsequent reconfiguration of the connectivity settings for the UE 10 based on different capabilities and feature sets, such as after entering a connected state. One purpose is to allow a UE initiated with minimum settings to change into a more capable device when necessary. This provides the benefit of progressive identification of the connectivity setting for the RedCap UE 10 according to a certain use case, such as identified by a certain RedCap profile, where part of the indication is obtained already at initial access. Hence, network resources can be better utilized as early as possible. As an example, in case access node 120 allocates specific resources for a certain RedCap profile, the UE can use those resources directly. If the access node 120 does not allocate resources to, or even bars, a specific RedCap profile, that UE 10 can use another RedCap profile where resources are allocated/supported. The solution also provides the possibility of switching connectivity settings between different sets of capabilities which are different from the minimum set. The UE 10 can have different requirements of performance depending on its momentary use case. As an example, the UE 10 may comprise, or be connected to, several sensors. One sensor may be always on, from which the UE 10 continuously/intermittently reports a read sensor value with low throughput requirements, such as low data rate and/or periodicity. Another sensor, in or connected to the UE 10, is only occasionally activated, but when it is activated it requires larger amount of system resources, such as higher data rate. During the high throughput time periods, i.e. when transmitting data from the second sensor to the network 100, the minimum redcap configuration might not be feasible. Likewise, during the low throughput time periods, configuration for a highly capable RedCap UE 10 or legacy NR UE might not be needed and may even lead to higher UE power consumption. Reconfiguring capabilities and feature sets to apply for the connection of the UE 10 for such a scenario will optimize UE power consumption.

In some embodiments, the reconfiguration can be accomplished by letting the UE have the option to have multiple sets of RedCap profiles, each identifying predefined capability settings and thereby unique capabilities for each RedCap profile. This enables UEs to change configurations in a faster way. Different RedCap profiles may be associated with different use cases of the UE 10. By changing RedCap profile, the connectivity of the UE 10 may be reconfigured according to an associated different set of capabilities and feature sets, whereby the connection of the UE 10 is configured in accordance with a different RedCap type, such as different from what was initially conveyed in the identification message transmitted at initial access.

In some embodiments, a RedCap profile is indicated by means of a RedCap profile ID, which is indicative of the associated connectivity settings. Where a change of RedCap profile is requested, this may be indicated by signaling the RedCap profile ID, which may be accomplished in a fast way for example in a control channel, or in a relatively slower way by any higher layer signaling. Indication in control channel is typically an indication resulting in a quick response (e.g. within a slot or 1 ms). For example data shared allocation as indicated by control channel can be within the same slot as control channel. Higher layer signaling is typically via RRC. The response of indication in RRC message is typically in multiple slots or tens-of msec. Indication Redcap profile in higher layer is typically sufficient. By signaling the RedCap profile ID, e.g. on a control channel or higher layer, enables a change of connectivity settings in accordance with a different set of capabilities or feature sets to take place also during an idle or inactive mode.

The update, or reconfiguration, of capabilities and feature sets to apply for the connection between the UE 10 and the network 100, as identified by a certain RedCap profile, may be requested from either the network 100 or the UE 10. The network 100 may also have the functionality to prohibit the UE 10 from choosing RedCap profiles.

Figure 6:
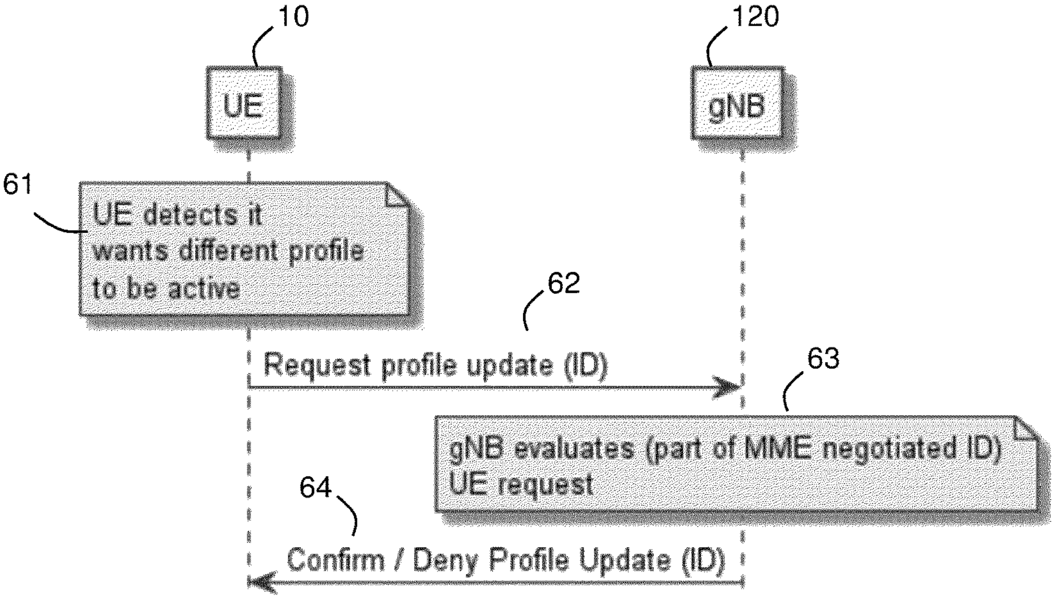
FIG. 6 shows a signaling diagram, schematically illustrating update of communication settings according to a stored profile, as requested by the UE.

FIG. 6 shows a signaling diagram which schematically illustrates UE-initiated reconfiguration of connectivity settings from one RedCap profile to another, to configure a different set of capabilities to apply in connection of the UE 10 to the network 100, as represented by the access node 120. A triggering event 61 may cause the UE 10 to want to employ a different set of capabilities. This may be related to the UE 10 being configured for a new use case. For example, a certain application may be activated in the UE 10, which requires extended or reduced capabilities for the UE 10 in connection with the network, compared to a current configuration. The UE 10 will then transmit a message 62 to the wireless network 100, to request a change of connectivity from a first RedCap profile to another, second, RedCap profile. In some embodiments, the second RedCap profile is associated with the same RedCap type, in the network, as the first RedCap type. As noted, the request may indicate the second RedCap profile by means of a RedCap profile ID. The network 100, such as a serving access node 120, may evaluate 63 the request. This may involve balancing the request with current traffic load in the cell served by the access node 120, and allowing the request based on a threshold criteria. The access node 120 may subsequently transmit a message 64 to the UE to confirm, or deny, the update of capabilities and features sets to apply, according to the second RedCap profile.

Figure 7:
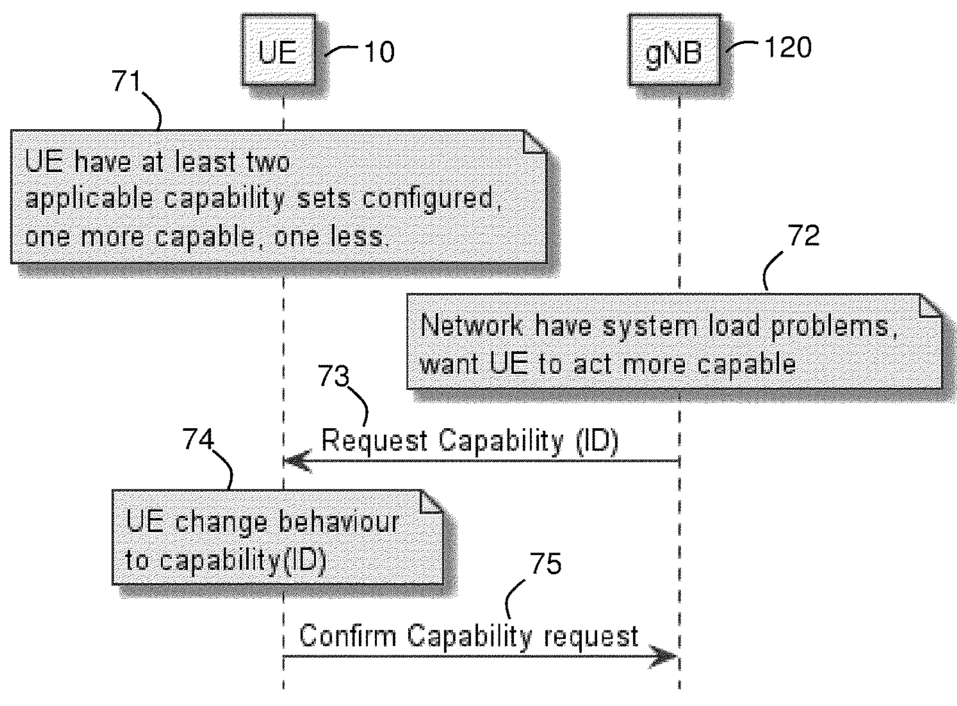
FIG. 7 shows a signaling diagram, schematically illustrating update of communication settings according to a stored profile, as requested by the network.

FIG. 7 shows a signaling diagram which schematically illustrates network-initiated reconfiguration of connectivity settings from one RedCap profile to another, to configure a different set of capabilities to apply for a connection of the UE 10 to the network 100. The UE 10 is adapted to operate in accordance with at least a first RedCap profile and a second RedCap profile. This is further known to the network 100, e.g. by means of the UE 10 having transmitted a message indicating one or more RedCap profiles to the network 100. At a certain point 71, capabilities associated with the first RedCap profile are presently active and agreed between the UE 10 and the network 100. The access node 120 may evaluate 72 its configuration status, such as for instance overall load in the cell or quality or connectivity status with respect to the UE 10. Based on the evaluation, the access node 120 may be configured to switch configuration with regard to the UE 10 to another predefined set of capabilities, or to reconfigure the active configuration, such as to change into accordance with the second RedCap profile. More specifically, the network 100 may also take its occupied resources into account. When system load is comparatively high, the access node 120 may be triggered to request the UE 10 to a configuration according to a RedCap profile, e.g. the first RedCap profile, which occupies less resources than the second RedCap profile. Conversely, at comparatively low system load, the access node 120 may be configured to allow the UE 10 to operate in accordance with a RedCap profile which occupies more resources. In certain scenarios, operation of the UE 10 in accordance with a less capable RedCap profile may occupy more resources than a more capable RedCap profile. For example, processing time or modulation of a low capability RedCap profile may be restricted to any number less than the maximum capability of the UE 10. The network 100 may therefore have the opportunity to force the UE 10 to communicate according to a more capable RedCap profile, and thus potentially override a request for a certain RedCap profile made by the UE 10. The result may be higher energy consumption at the UE 10. The access node 120 may thus transmit a request 73 to the UE 10, comprising an instruction to change connectivity to another RedCap profile than the presently active RedCap profile. The UE 10 thereby reconfigures 74 to change its behavior in accordance with the ordered RedCap profile and may transmit an acknowledgement 75 to the access node 120 to that effect. In another example, when system load (e.g. resource allocations) for a specific redcap UE profile is comparatively high, the access node 120 may be triggered to bar any associated new redcap UE profile to access. The access node 120 may be triggered to request UE 10 to use other redcap profile.

Figure 8:
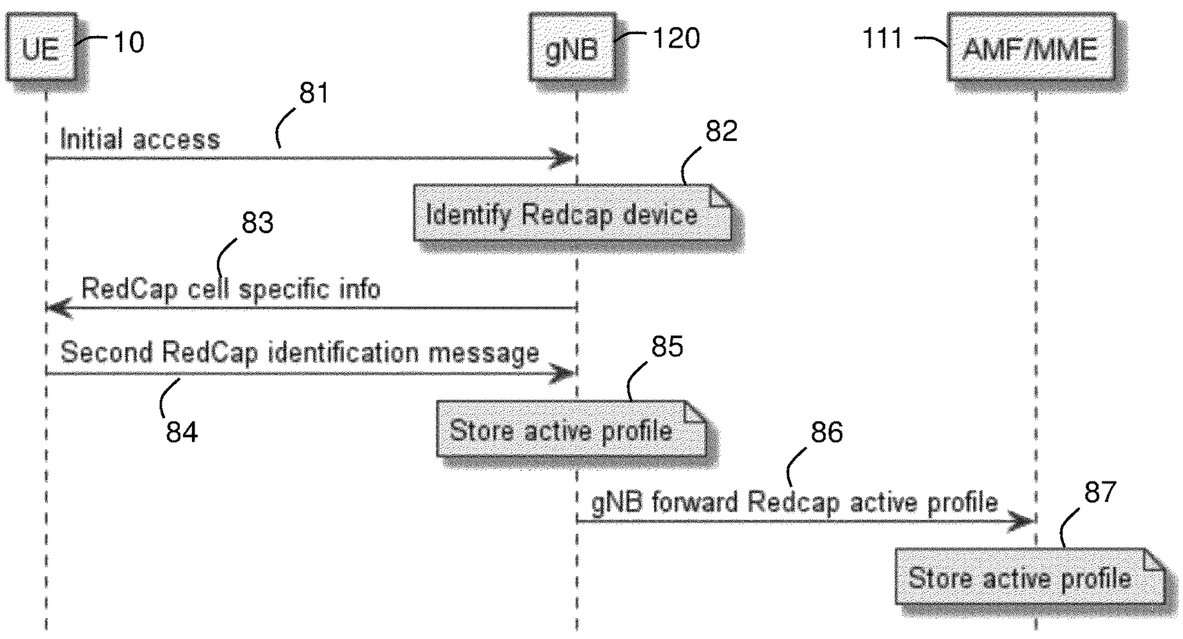
FIG. 8 shows a signaling diagram, schematically illustrating progressive identification and storing of a profile, according to various embodiments.

FIG. 8 shows a signaling diagram which schematically illustrates an example of the proposed method, including core network communication. The proposed method, as outlined with reference to various examples herein, provides for gradual, or progressive, reporting of capabilities for a RedCap UE 10, for use in configuration of the UE 10 with respect to the network 100. In a first step, or part, of the identification of capabilities, the UE 10 transmits an identification message in PRACH, which identifies the UE 10 as being a RedCap device. The first part may comprise:

a. RedCap type, which identifies the UE 10 is a RedCap device, possibly by identifying one of a plurality of RedCap types. This may be executed by transmission of the identification message 81 to the network 100, as represented by the access node 120. The first part represents a part of the UE capabilities, i.e. the core capabilities which represents device limited capability (e.g. limited BW, limited Tx or Rx antennas) for the indicated RedCap type.

b. Pointer to previously used/registered RedCap profile, where such a RedCap has previously been stored in the network 100. This too is conveyed in the identification message 81.

The UE 10 is thus identified 82 as a RedCap device by the access node 120, an enters connected mode (RRC CONNECTED) initially using either the minimum set of capabilities associated with the RedCap type, or an already stored RedCap profile, if so indicated in the indication message 81. The UE 10 configured 83 by the access node 120 with cell-specific information.

The existing capabilities, feature sets, and RedCap profiles will be provided by UE 10. Optionally this information is also signaled (not indicated) to and stored in the core network 110. The network 100 may therefore store the information, e.g. in a core network node 111, such as AMF/MME, communicated by RAN (Radio Access Network) over S1/N2 interface. the UE 10 thus transmits any RedCap profile or associated capabilities to an access node 120 of the RAN, whereafter RAN forwards the information to the core network 110.

In legacy, the UE capability is only provided by the UE based on an access node request. Contrary to legacy behavior, the proposed method involves the UE 10 sending the first part of capability without the request from access node 120 during initial access. That first part, which is provided in the identification message 81, identifies the RedCap type and is thus based on the functionality/use-case of the UE 10, whereas legacy is based on band information.

When in connected mode, the UE 10 transmits a message 84 as a second part of capability signaling. This message 84 may comprise an identification of one or more further RedCap profiles for registration in the network 100, where different RedCap profiles may be associated with different use cases of the UE 10. This message 84 may comprise a full set of capabilities for one or more RedCap profiles. As an example, a legacy NR UE may additionally be intended to operate as a device to support sensor operation, according to a RedCap profile. The UE 10 can then be operated with a profile of RedCap device, i.e. to save power consumption. Basically, a complex device can support multiple profiles. The access node 120 may store 85 one RedCap profile as an active profile, according to which the UE 10 is configured. Moreover, the registration of the active RedCap profile may be forwarded to 86 and stored 87 in the core network node 111.

If the core network node 111 has already collected UE capabilities for a RedCap profile indicated in the identification message 81, the indication message 81 may simply identify that RedCap profile, e.g. by a pointer to an ID. Once access node 120 receives that pointer, it may communicate with the core network node 111 and obtain all capabilities related to that ID. This way, the access node 120 need not request associated capability information from the UE 10.

In some embodiments, a message 84 transmitted from the UE 10 to the network 100 may identify a request to disassociate one or more RedCap profile from the RedCap type for the UE 10. This may have the effect of deleting one or more previously stored RedCap profiles.

As outlined before, the proposed method makes it possible to subsequently make a dynamic change of capabilities used in the Connected mode, by requesting a change of RedCap profile. This dynamic change may entail one of shifting to using another RedCap profile, or going back to minimum set, which can be triggered by the UE 10 or the access node 120.

Figure 9:
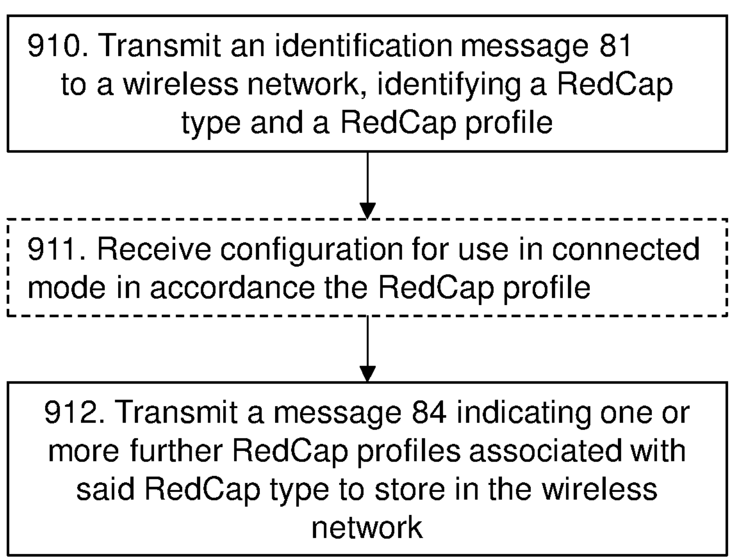
FIG. 9 is a flow chart of the method as carried out in the UE, according to a general embodiment.

FIG. 9 is a flow chart of various steps comprised in a general embodiment of the proposed solution, as carried out by the UE 10, for progressive identification of the UE as a RedCap device. The method comprises:

transmitting 910, to a wireless network at an initial access procedure, an identification message 81 identifying a RedCap type of the UE and a RedCap profile associated with the RedCap type, wherein the RedCap profile is indicative of a set of connectivity parameters to be used when establishing a connection to the wireless network. In this step, enough information to transfer the UE 10 to connected mode is provided, such as a minimum set of connectivity parameters associated with the RedCap type.

The method further comprises transmitting 912, to the wireless network, a message 84 indicating one or more further RedCap profiles associated with said RedCap type to store in the wireless network. The indication message 81 transmitted at initial access is arranged to convey required information for establishing a connection, and may indicate a prestored RedCap profile or minimum required connectivity parameters. The subsequent message 84 may comprise actual UE capabilities, including detailed parameter information. This may relate to detailed capability parameters associated with an active RedCap profile, or capability parameter information for each RedCap profile the UE 10 supports. Examples of legacy UE capability parameters are defined in 3GPP TS 38.306 v16.1.

In some embodiments, the method may involve receiving 911, from the wireless network, configuration 83 for use in a connected mode in accordance the RedCap profile identified by said identification message. This may be required if full information of the further RedCap profile(s) must be conveyed, rather than being pointed to by means of a RedCap profile ID.

Figure 10:
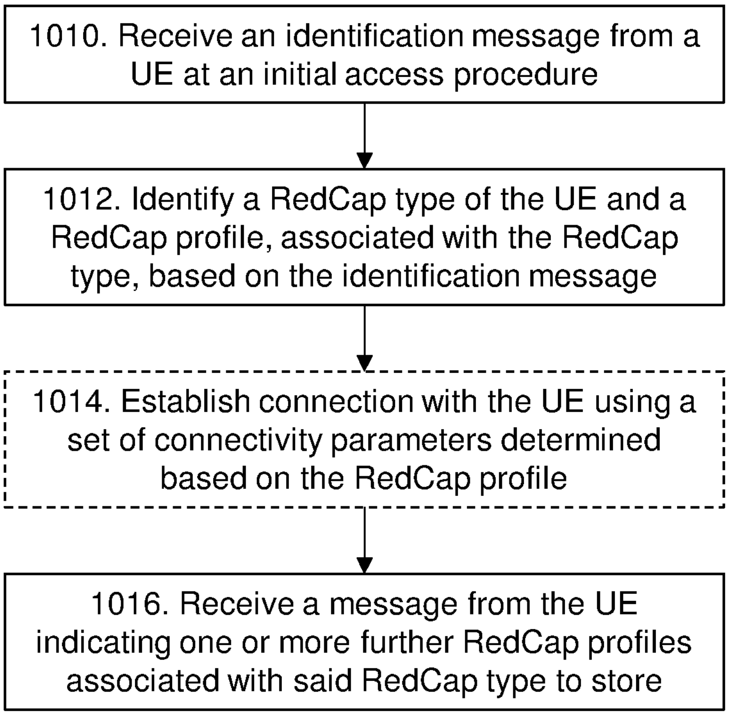
FIG. 10 is a flow chart of the method as carried out in an access node of the wireless network, according to a general embodiment.

FIG. 10 is a flow chart of various steps comprised in a general embodiment of the proposed solution, as carried out by the access node 120, for progressive identification of the UE 10 as a RedCap device. The method comprises:

receiving 1010, from the UE at an initial access procedure, an identification message;

identifying 1012 a RedCap type of the UE and a RedCap profile, associated with the RedCap type, based on the identification message, wherein the RedCap profile identifies a set of connectivity parameters for establishing connection with the UE; and receiving 1016, from the UE, a message indicating one or more further RedCap profiles associated with said RedCap type to store in the wireless network.

In some embodiments, the method may comprise establishing a connection with the UE using the set of connectivity parameters determined based on the RedCap profile, as indicated for step 911 of FIG. 9.

The proposed solution outlined herein provides early and effective identification of a RedCap UE. For UEs capable of operating according to a plurality of different RedCap profiles, the method provides reduced signaling of conveying and selecting the profile. The solution further provides the possibility for the network 100 to identify and handle a RedCap UE at early stage even during initial access, which may save resources.

The invention claimed is:

1. A method for use in a user equipment (UE) for progressive identification of the UE as a reduced capability (RedCap) device, the method comprising:

transmitting, to a wireless network at an initial access procedure, an identification message identifying a RedCap type of the UE and a RedCap profile associated with the RedCap type, wherein the RedCap profile is indicative of a set of connectivity parameters to be used when establishing a connection to the wireless network;

receiving, from the wireless network, configuration for use in a connected mode in accordance with the RedCap profile identified by said identification message, and transmitting, to the wireless network, a message indicating one or more further RedCap profiles associated with said RedCap type to store in the wireless network.

2. The method of claim 1, wherein the identification message identifies one out of a plurality of predetermined RedCap types.

3. The method of claim 2, wherein at least some of the RedCap profiles are associated with different use cases of the UE.

4. The method of claim 2, comprising: transmitting, to the wireless network, a request to change connectivity to another RedCap profile associated with the RedCap type.

5. The method of claim 2, comprising: receiving, from the wireless network, an instruction to change connectivity to another RedCap profile associated with the RedCap type.

6. The method of claim 2, comprising: transmitting, to the wireless network, a request to disassociate one or more RedCap profile from the RedCap type for the UE.

7. The method of claim 1, wherein the identification message indicates a RedCap profile previously reported by the UE.

8. The method of claim 1, wherein the identification message indicates one of a RedCap profile previously reported by the UE, or a predetermined minimum requirement RedCap profile identifying a minimum set of connectivity parameters associated with the identified RedCap type.

9. The method of claim 1, wherein the RedCap profile corresponds to a group of UEs having a same set of capabilities.

10. A user equipment (UE) adapted for progressive identification as a reduced capability (RedCap) device, wherein the UE comprises:

a transceiver for communicating with a wireless network; and logic configured to control the transceiver to transmit, to the wireless network at an initial access procedure, an identification message identifying a RedCap type of the UE and a RedCap profile associated with the RedCap type, wherein the RedCap profile is indicative of a set of connectivity parameters to be used when establishing a connection to the wireless network;

receive, from the wireless network, configuration for use in a connected mode in accordance with the RedCap profile identified by said identification message; and transmit, to the wireless network, a message indicating one or more further RedCap profiles associated with said RedCap type to store in the wireless network.

11. The user equipment of claim 10, wherein the identification message identifies one out of a plurality of predetermined RedCap types.

12. The user equipment of claim 10, wherein the identification message indicates a RedCap profile previously reported by the UE.

13. A method for use in an access node of a wireless network for communication with a user equipment (UE) operating as a reduced capability (RedCap) device, the method comprising:

receiving, from the UE at an initial access procedure, an identification message;

identifying a RedCap type of the UE and a RedCap profile, associated with the RedCap type, based on the identification message, wherein the RedCap profile identifies a set of connectivity parameters for establishing connection with the UE;

transmitting, to the UE, configuration for use in a connected mode in accordance with the RedCap profile identified by said identification message; and receiving, from the UE, a message indicating one or more further RedCap profiles associated with said RedCap type to store in the wireless network.

14. The method of claim 13, wherein the identification message identifies one out of a plurality of predetermined RedCap types stored in the wireless network.

15. The method of claim 14, wherein at least some of the RedCap profiles are associated with different use cases of the UE.

16. The method of claim 14, comprising: receiving, from the UE, a request to change connectivity to another RedCap profile associated with the RedCap type.

17. The method of claim 14, comprising: transmitting, to the UE, an instruction to change connectivity to another RedCap profile associated with the RedCap type.

18. The method of claim 14, comprising: receiving, from the UE, a request to disassociate one or more RedCap profile from the RedCap type for the UE.

19. The method of claim 13, wherein the identification message indicates a RedCap profile previously reported by the UE.

20. The method of claim 13, wherein the identification message indicates one of a RedCap profile previously reported by the UE, or a predetermined minimum requirement RedCap profile identifying a minimum set of connectivity parameters associated with the identified RedCap type.

* * * * *